United States Patent [19]

Kubin et al.

[11] 4,360,989
[45] Nov. 30, 1982

[54] GREENHOUSE

[75] Inventors: Johann Kubin; Hermann Peer, both of Linz; Gottfried Sodeck, Vienna, all of Austria

[73] Assignee: Voest-Alpine Aktiengesellschaft, Linz, Austria

[21] Appl. No.: 282,818

[22] Filed: Jul. 13, 1981

[30] Foreign Application Priority Data

Jul. 28, 1980 [AT] Austria .................................. 3910/80

[51] Int. Cl.³ ............................................. A01G 31/02
[52] U.S. Cl. ...................................................... 47/65
[58] Field of Search ................................ 47/17, 59, 65

[56] References Cited
U.S. PATENT DOCUMENTS 4,255,897 3/1981 Ruthner ................................... 47/65

FOREIGN PATENT DOCUMENTS

| 298869 | 9/1971 | Austria . | |
|---|---|---|---|
| 312983 | 5/1973 | Austria . | |
| 350830 | 11/1978 | Austria . | |
| 412457 | 11/1966 | Sweden . | |
| 1512606 | 6/1978 | United Kingdom | 47/65 |
| 1518757 | 7/1978 | United Kingdom | 47/65 |

*Primary Examiner*—Robert E. Bagwill
*Attorney, Agent, or Firm*—Brumbaugh, Graves, Donohue & Raymond

[57] ABSTRACT

A greenhouse includes a cage-like supporting structure in which an endless circulating belt is guided about upper and lower deflection pulleys and adapted for accommodating developing organisms. In order to be able to set it up easily and without foundation work by avoiding as much dead volume as possible, the deflection pulleys are arranged on longitudinal carriers that extend over the total length of the greenhouse and are movably supported on the supporting structure.

15 Claims, 4 Drawing Figures

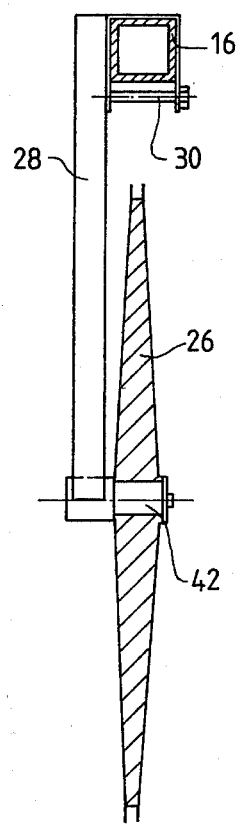
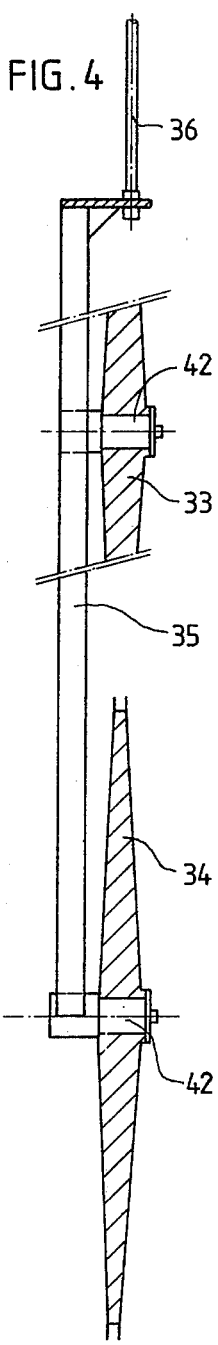

GREENHOUSE

The invention relates to a greenhouse comprising a cage-like supporting structure in which an endless circulating belt guided about upper and lower deflection pulleys and adapted for accommodating developing organisms is provided.

A plurality of demands are required of greenhouses of this kind; they are to be simple in manufacture, easy to mount, and to require little foundation work; they are to be easily erected on a compacted ground, remaining fully operative when the ground sets. A further requirement is that the volume within the greenhouse be utilized as optimally as possible, i.e. that it comprises an amount as small as possible of dead volume to be air-conditioned thus consuming energy.

A greenhouse of the initially-defined kind is known from Austrian Pat. No. 298,869. In this known greenhouse each standard of the house carries a separate circulating belt guided about deflection pulleys, a plurality of adjacently arranged circulating belts thus being provided. By the arrangement of the individual circulating belts on a standard of their own, the setting of the ground is of no particular relevance. If one of the standards sinks, also the circulating belt arranged on it will go down, which has no effect on the neighbouring circulating belts. The arrangement of a plurality of adjacently arranged circulating belts, however, has the disadvantage of requiring very much space between the circulating belts for the operating personnel, which space calls for an unduly big and therefore expensive greenhouse and, moreover, constitutes an energy-consuming dead volume. Moreover, a separate drive is required for each of the circulating belts, which is also consuming.

The invention aims at avoiding these disadvantages and difficulties and has as its object to provide a greenhouse of the initially-defined kind, which can be built particularly easily an erected without cumbersome foundation work, however, with dead volume within the greenhouse being avoided as far as possible, i.e. the greenhouse is to be kept as small as possible in terms of its dimensions, thus enabling the saving of energy as compared to known greenhouses.

This object is achieved according to the invention in that the deflection pulleys are arranged on longitudinal carriers extending over the total length of the greenhouse and movably supported on the supporting structure. The greenhouse according to the invention, despite the arrangement of a circulating belt that extends over the total length of the greenhouse (dead volumes thus being avoided with an optimum utilization of space), makes possible to do without foundations, since deformations and displacements of the cage-like supporting structure may change the position of the longitudinal carriers, yet remain without influence on the transporting system for the organisms mounted on the longitudinal carriers. The cage-like supporting structure, with the greenhouse of the invention, may be designed as a particularly light steel structure.

According to a preferred embodiment the longitudinal carriers carrying the upper deflection pulleys loosely rest on the cage-like supporting structure, and the longitudinal carriers carrying the lower deflection pulleys are mounted on the supporting structure so as to be displaceable or pivotable in the vertical direction, which combines the advantages of a minimum structural expenditure and a most simple assembly. The longitudinal carriers, which are mounted so as to be displaceable or pivotable in the vertical direction, make possible to keep the circulating belt always in a tensioned state independently of deformations of the supporting structure (e.g. due to ground setting). Since a plurality of rollers can be moved by the longitudinal carriers displaceably or pivotably mounted on the supporting structure, the tensioning of the circulating belt may be effected by a very slight lift, i.e. with a slight vertical movability of the longitudinal carriers.

Advantageously, the longitudinal carriers carrying the lower deflection pulleys with one end are hinged to the supporting structure and with the other end are spring-mounted in the vertical direction relative to the supporting structure, wherein, suitably, the pivotable ends of the longitudinal carriers carrying the lower deflection pulleys are each supported on a console arranged on the supporting structure by means of a helical spring, a cup spring or any other springs.

The longitudinal carriers carrying the upper deflection pulleys suitably are secured against lateral displacement, i.e. transverse to the longitudinal direction of the greenhouse, by means of connecting elements.

According to a preferred variant, the upper and lower deflection pulleys are each rotatably journaled on vertically directed arms fastened to the longitudinal carriers, preferably clampable by means of a clamping connection, wherein the arms that carry the upper deflection pulleys are directed vertically downwardly and the arms that carry the lower deflection pulleys are directed vertically upwardly, which has the advantage that the deflection pulleys, which are tensioned relative to each other by the circulating belt, always assume a position that is favorable with respect to the forces acting from the circulating belt onto them, the friction and thus the wear between the rollers and the circulating belt thus being kept as low as possible. It is therefore possible to do with low driving performances for the circulating belt, no clamping of the circulating belt occurring even with great deformations of the supporting structure.

A further preferred embodiment is characterized in that between the upper and lower deflection pulleys further deflection pulleys are arranged which are fastened to the longitudinal carriers carrying the upper deflection pulleys, the circulating belt thus being further movable in the upper part of the greenhouse in the longitudinal direction of the same upon meander-shaped deflection and in the lower part of the same in the opposite direction also upon meander-shaped deflection. By this double meanderlike to-and-fro movement of the circulating belt a high stress of the circulating belt and the bearings of the deflection pulleys may be prevented, as occurs, for instance, with a structure of a greenhouse according to Austrian Pat. No. 254,595. With this known structure the circulating belt is returned horizontally from one end of the greenhouse to the other. The sag of the circulating belt caused by this horizontal return not only results in a great stress of the belt, but also requires an increased driving performance.

Suitably, two deflection pulleys each of the further deflection pulleys are rotatably mounted on a carrier connecting the bearings of these deflection pulleys, wherein the carrier is fastened to the longitudinal carrier carrying the upper deflection pulleys by means of a connecting means accommodating tensile forces, such as a tension rod. This has the advantage that the forces of the two deflection pulleys journaled one above the other on the common carrier counterbalance one another, only a slight residual force remaining, which corresponds approximately to the dead weight of the pulleys and the carrier and is directed vertically downwardly. Thereby the longitudinal carriers carrying the deflection pulleys are only slightly stressed and small dimensions for these longitudinal carriers will do.

The supporting structure advantageously is formed by subsequently arranged U-shaped, downwardly open gates, wherein the plane of the gates is directed transversely to the longitudinal direction of the greenhouse, and wherein at least two of these gates are connected with each other by a free wind bracing and the longitudinal carriers comprising the upper deflection pulleys are supported on the upper ends of the gates and the longitudinal carriers carrying the lower deflection pulleys are provided on the lower ends of the gates, whereby the supporting structure may be assembled in any desired length according to a building-block system, the setting of individual gates again being irrelevant to the mechanical part of the greenhouse relating to the transporting system. The simple assembly of the greenhouse may be carried out also by unskilled labour.

In order not to have to provide a separate foundation also for the driving aggregate of the circulating belt, the driving aggregate suitably is fastened to one of the longitudinal carriers.

Preferably, the U-shaped gates, in addition to the wind bracing, are connected with ledges extending in the longitudinal direction of the greenhouse, the ledges being fastened to the gates by means of connecting means allowing for a relative movement between the gates and the ledges. To these ledges extending in the longitudinal direction the fastening of insulation boards may be realized, the insulation boards remaining unaffected in case of displacements of the supporting structure.

The suspension of the deflection pulleys suitably is designed in a manner that the arms carrying the deflection pulleys are fastened laterally on the longitudinal carriers and the bearings of the deflection pulleys project out in the direction of the lateral arrangement of the longitudinal carriers, so that the pulleys are exactly vertically below the longitudinal carriers.

The invention will now be explained in more detail with reference to the accompanying drawings, wherein:

FIGS. 3 and 4 illustrate details sectioned along lines III—III and IV—IV, respectively, of FIG. 2, on an enlarged scale.

Figure 1:
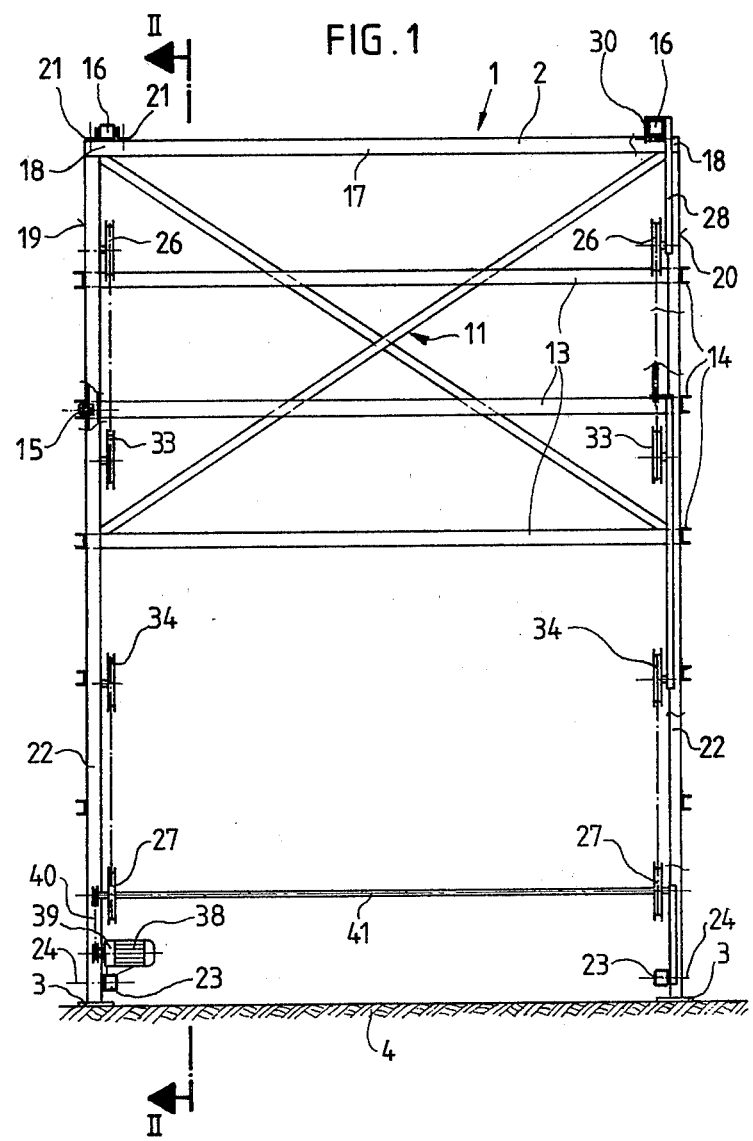
FIG. 1 is a partially sectioned front view of a greenhouse according to the invention.
Figure 2:
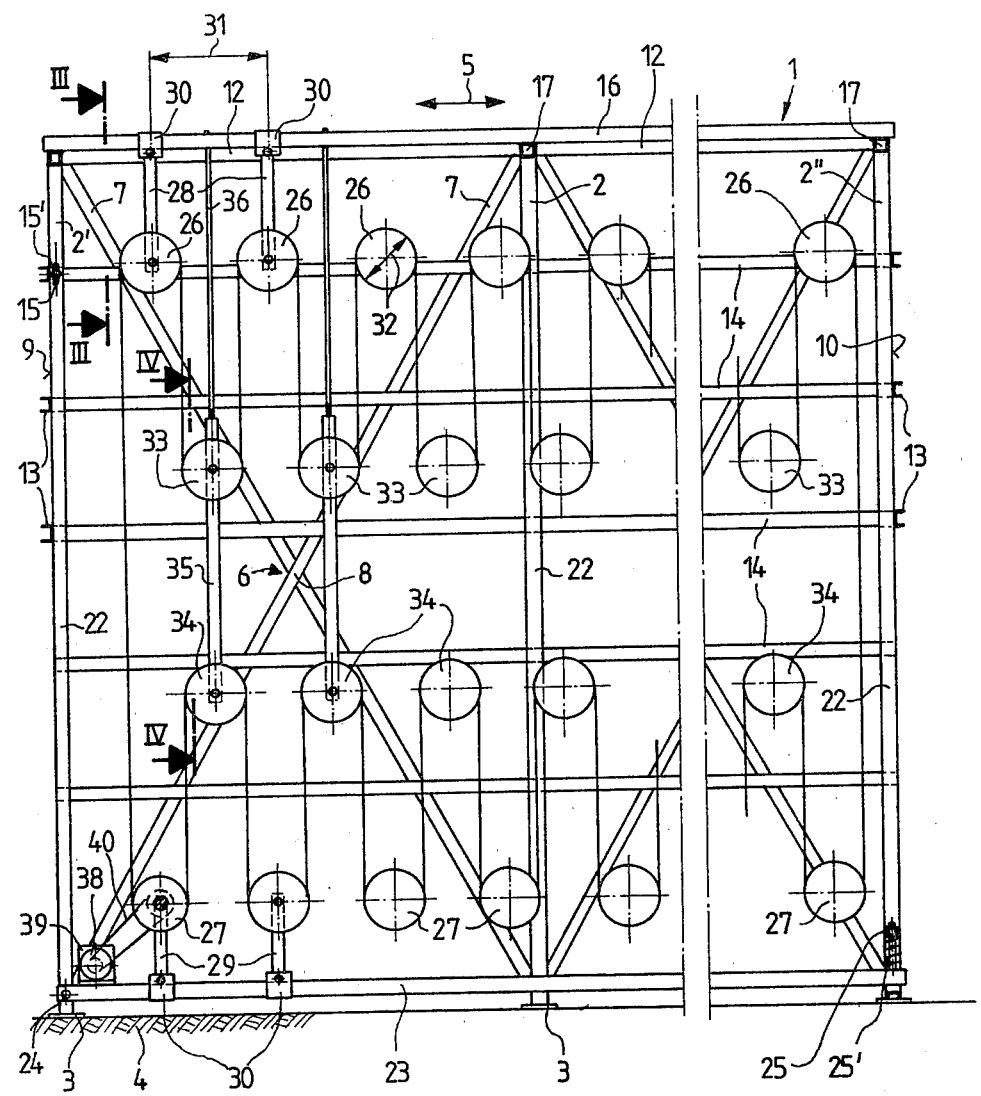
FIG. 2 is a sectional representation of the greenhouse according to a section laid along line II—II of FIG. 1.

The cage-like supporting structure 1 of the greenhouse is formed by subsequently arranged U-shaped gates 2, 2', 2" that are downwardly open. These gates consist of non-buckling, closed square sections connected by welding. The lower ends of the gates carry foot plates 3 via which the gates 2, 2', 2" rest on the compacted ground 4. Each plane of the gates extends transversely to the longitudinal direction 5 of the greenhouse. At least two subsequently arranged gates 2, 2', 2" are connected by a free wind bracing 6. With this wind bracing the two struts 7 are not connected at their point of intersection 8. Thereby a stabile structure is ensured, which permits the setting of individual gates.

The gates 2', 2" arranged on the front sides 9, 10 of the greenhouse are reinforced transversely to the longitudinal direction 5 by a conventional wind bracing 11. The horizontally arranged roof truss 12 also is a conventional one.

In the longitudinal and transverse directions, sectional ledges 13, 14 are mounted to the outer sides of the greenhouse, to which ledges soft insulation boards (not illustrated), for instance inwardly mirrored ones, may be attached.

The sectional ledges 14 extending in the longitudinal direction 5 are connected with the individual gates 2, 2', 2" in a manner that slight movements of these longitudinal ledges relative to the gates are possible. This may, for instance, be effected by horizontally or vertically extending longitudinal holes 15 penetrating the sectional ledges or gates and which are penetrated by screws 15'. It is, however, also possible to provide elastic connecting means, for instance of rubber, between the sectional ledges 14 and the gates 2, 2', 2".

On the upper side of this cage-like supporting structure 1 two longitudinal carriers 16 extending over the total length of the greenhouse are supported. These longitudinal carriers loosely rest on the upper horizontal parts 17 of the gates 2, 2', 2", i.e. one of these longitudinal carriers 16 connects the corners 18 of the gates at one longitudinal side wall 19 and the other longitudinal carrier connects the corner points 18 at the opposite longitudinal side wall 20. The longitudinal carriers 16 are merely secured, by brackets 21, against displacement in the transverse direction and thus against falling down from the supporting structure 1.

On the lower ends of the vertical struts 22 of the gates two further longitudinal carriers 23 are provided, one of which is located at one longitudinal side wall 19 and the other of which is located at the opposite longitudinal side wall 20. Each of these longitudinal carriers 23 is hinged to the first front-side gate 2' by a joint 24 and with the rear end is resiliently pressed downwardly by means of a helical spring 25' on the final front-side gate 2" of the greenhouse relative to a console 25 fastened to the lower end of the struts 22 of this gate. The action of the springs 25' is assisted by the dead weight of the longitudinal carriers 23 and of the lower deflection pulleys. A connection of these longitudinal carriers with the gates 2 arranged between the front-side gates 2', 2" is not provided, so that these longitudinal carriers are pivotable about the joints 24.

On the longitudinal carriers 16 and 23 deflection pulleys 26, 27 for a meander-likely guided circulating belt for accommodating developing organisms, such as plants, are arranged, the deflection pulleys 26, 27 each being rotatably journaled on arms 28, 29 which are clampable on the longitudinal carriers by means of clamp connections 30, wherein upper deflection pulleys 26 are rotatably journaled on tension arms 28, 29 directed downwardly from the upper longitudinal carriers 16 and the lower deflection pulleys 27 arranged opposite the same are rotatably journaled on tension arms 28, 29 directed upwardly from the downwardly arranged longitudinal carriers 23.

Between these tension arms, which are mounted approximately at a distance 31 of two diameters 32 of the deflection pulleys 26, 27 two further deflection pulleys 33, 34 are each arranged, which are provided on a common carrier 35 suspended over a tension rod 36 on the upper longitudinal carriers 16 by means of a screw connection. These further deflection pulleys 33, 34 are arranged between the upper and lower deflection pulleys 26, 27 not only in the longitudinal direction 5, but also in the vertical direction.

The circulating belt 37 is guided about the deflection pulleys in a manner that it is guided in the upper part of the greenhouse in the longitudinal direction of the greenhouse upon meander-like deflection about the pulleys 26, 33, as can be seen from FIG. 1, then downwardly reaches a lower deflection pulley 27 at one front side, and from there is guided in the lower part of the greenhouse upon meander-like deflection about the pulleys 27 and 34 back to the front side.

The circulating belt 37, in a manner known per se (Austrian Pat. No. 298,869), is formed by two chains laterally guided about the deflection pulleys and connected by horizontal transverse carriers (not illustrated). On the transverse carriers the containers accommodating the plants may be fastened.

On a lower longitudinal carrier 23 the driving motor 38 including a gear 39 and a transmission chain 40 is arranged. The transmission chain 40 drives a lower deflection pulley 27, which, for a synchronous drive of the two chains, is connected with the corresponding deflection pulley 27 arranged on the opposite longitudinal side wall via a shaft 41.

By the resilient mounting of the lower longitudinal carriers the circulating belt 37 is tensioned, only very slight vertical movements of the longitudinal carriers 23 being necessary. (The lower longitudinal carriers 23 for this purpose could be vertically guided and spring-mounted on both ends).

As can be seen from FIGS. 3 and 4, the tension arms 28, 29 and carriers 35 carrying the deflection pulleys 26, 27 and 33, 34 comprise inwardly projecting bearing journals 42 for the deflection pulleys, the deflection pulleys thus being exactly vertically below the longitudinal carriers. The deflection pulleys thereby can precisely adapt to the circulating belt, slanted positions of the deflection pulleys being prevented.

The advantage of the greenhouse according to the invention resides in the fact that is is composed of two parts, i.e. of a cage-like supporting structure 1 on the one hand which is designed as a lightweight construction and also adapts very well to the setting of the ground, and of the complex comprising the mechanical part of the plant and provided within the supporting structure on the other hand, which complex is formed by the longitudinal carriers allowing for relative movements relative to the supporting structure. The mechanical part, due to this mode of construction, is largely unaffected of changes of the cage-like supporting structure caused by the setting of the ground. The movable arrangement of the longitudinal carriers on the supporting structure furthermore produces an exact alignment of the oppositely arranged deflection pulleys in respect of one another so that the circulating belt will be guided without jamming.

What we claim is:

1. In a greenhouse including a cage-like supporting structure, deflection pulley means including upper and lower deflection pulleys arranged within said supporting structure, and an endless circulating belt guided about said upper and lower deflection pulleys and adapted for accommodating developing organisms, the improvement comprising longitudinal carrier means extending over the total length of said greenhouse and movably supported on said supporting structure, said deflection pulley means being arranged on said longitudinal carrier means.

2. A greenhouse as set forth in claim 1, wherein said longitudinal carrier means comprise first longitudinal carriers carrying said upper deflection pulleys and second longitudinal carriers carrying said lower deflection pulleys, said first longitudinal carriers loosely resting on said supporting structure and said second longitudinal carriers being mounted on said supporting structure so as to be displaceable in the vertical direction.

3. A greenhouse as set forth in claim 1, wherein said longitudinal carrier means comprise first longitudinal carriers carrying said upper deflection pulleys and second longitudinal carriers carrying said lower deflection pulleys, said first longitudinal carriers loosely resting on said supporting structure and said second longitudinal carriers being mounted on said supporting structure so as to be pivotable in the vertical direction.

4. A greenhouse as set forth in claim 1, wherein said longitudinal carrier means comprise first longitudinal carriers carrying said upper deflection pulleys and second longitudinal carriers carrying said lower deflection pulleys, and wherein said second longitudinal carriers with one end are hinged to said cage-like supporting structure and with their other end are resiliently mounted relative to said cage-like supporting structure in the vertical direction.

5. A greenhouse as set forth in claim 4, further comprising a console arranged on said cage-like supporting structure and a spring for mounting said other end of said second longitudinal carriers.

6. A greenhouse as set forth in claim 1, wherein said longitudinal carrier means comprise first longitudinal carriers carrying said upper deflection pulleys and second longitudinal carriers carrying said lower deflection pulleys, and further comprising connection elements for securing said first longitudinal carriers against lateral displacement transversely to the longitudinal direction of said greenhouse.

7. A greenhouse as set forth in claim 1, further comprising first arms directed vertically downwards and rotatably jounaling said upper deflection pulleys, and second arms directed vertically upwards and rotatably journaling said lower deflection pulleys, said first and second arms being fastened to said longitudinal carrier means.

8. A greenhouse as set forth in claim 7, further comprising a clamping connection for clamping said first and second arms to said longitudinal carrier means.

9. A greenhouse as set forth in claim 7, wherein said arms carrying said deflection pulleys are fastened laterally on said longitudinal carrier means, and further comprising deflection pulley bearings projecting in the direction of the lateral arrangement of said longitudinal carrier means.

10. A greenhouse as set forth in claim 1, wherein said longitudinal carrier means comprise first longitudinal carriers carrying said upper deflection pulleys and second longitudinal carriers carrying said lower deflection pulleys, and further comprising a greenhouse upper part and a greenhouse lower part and further deflection pulleys provided between said upper and lower deflection pulleys and fastened to said first longitudinal carriers, for moving said endless circulating belt upon meanderlike deflection in the longitudinal direction of said greenhouse in said greenhouse upper part and in the opposite direction in said greenhouse lower part also upon meanderlike deflection.

11. A greenhouse as set forth in claim 10, further comprising bearings provided for said further deflection pulleys, a common carrier connecting the bearings of two of said further deflection pulleys, said two of said further deflection pulleys being rotatably journaled on said common carrier, and connecting means accommodating tensile forces for fastening said common carrier to said first longitudinal carriers.

12. A greenhouse as set forth in claim 11, wherein said connecting means comprise a tension rod.

13. A greenhouse as set forth in claim 1, wherein said longitudinal carrier means comprise first longitudinal carriers carrying said upper deflection pulleys and second longitudinal carriers carrying said lower deflection pulleys, and wherein said cage-like supporting structure is comprised of subsequently arranged U-shaped gates having upper ends and lower ends and being downwardly open, the plane of said gates being directed transversely to the longitudinal direction of said greenhouse, and further comprising a free wind bracing for connecting at least two of said gates, said first longitudinal carriers resting on said upper ends of said gates and said second longitudinal carriers being provided on said lower ends of said gates.

14. A greenhouse as set forth in claim 13, further comprising ledges extending in the longitudinal direction of said greenhouse and connected with said gates, and further connecting means for fastening said ledges to said gates by allowing for a relative movement between said gates and said ledges.

15. A greenhouse as set forth in claim 1, further comprising a driving aggregate fastened to one of said longitudinal carrier means and adapted for driving said endless circulating belt.

* * * * *